Jan. 28, 1969 A. GAYET 3,425,041

DATA STORAGE DEVICE

Filed Feb. 23, 1966 Sheet 1 of 2

Inventor:
Alain Gayet
By Baldwin & Wight
Attorneys

Inventor:
Alain Gayet
BY Baldwin & Wight
Attorneys

United States Patent Office
3,425,041
Patented Jan. 28, 1969

3,425,041
DATA STORAGE DEVICE

Alain Gayet, Paris, France, assignor to Societe Industrielle Bull-General Electric (Societe Anonyme), Paris, France
Filed Feb. 23, 1966, Ser. No. 529,582
Claims priority, application France Mar. 26, 1965, 10,894
U.S. Cl. 340—173.1 2 Claims
Int. Cl. G11b 9/00

Figure 1:
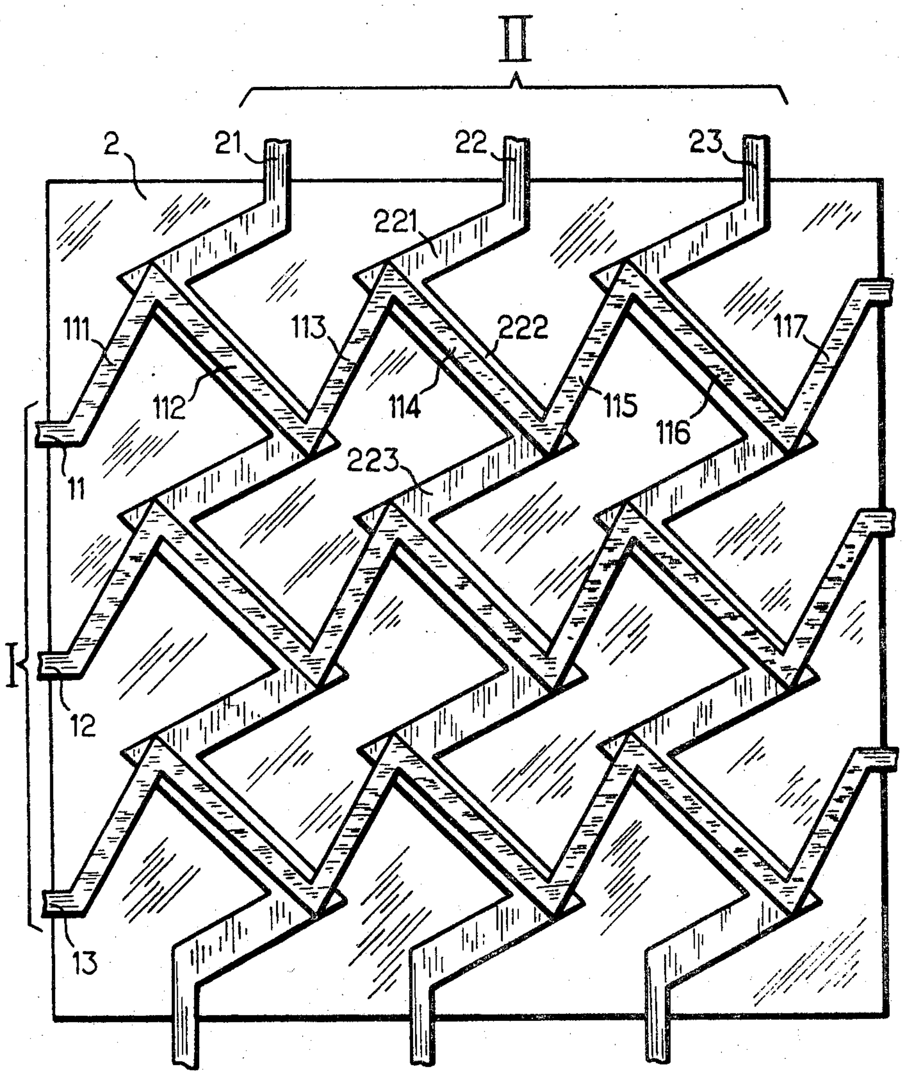

This invention relates to storage matrices in which the storage elements are selected by means of parallel coincident currents.

In these storage matrices, the useful portions of the selecting conductors relative to one and the same storage element, i.e., those portions of these conductors which are disposed along this storage element so as to subject the latter to the electromagnetic action of the currents flowing through them, are parallel to one another and juxtaposed along this storage element.

In known storage matrices of this type, the column selecting conductors, for example, are rectilinear, while the row selecting conductors are in crenelated form, so as to provide useful portions parallel to the columns and disposed side-by-side along the storage elements.

Owing to these arrangements, the admissible maximum density of storage elements is lower in the direction parallel to the rectilinear conductors than in the perpendicular direction, and in a storage matrix of maximum capacity the switching circuit which controls the access to the conductors of one of the series (rows or columns) differs in its form and in its dimensions from the switching circuit which controls the access to the conductors of the other series.

Another consequence of the aforesaid arrangement is that a current flowing through a crenelated selecting conductor travels through the successive useful portions of this selecting conductor in opposite directions.

Consequently, in order to record the same datum in two successive storage elements which are situated along a common crenelated selecting conductor, it is necessary to cause the writing currents to flow in opposite directions, either in the crenelated selecting conductor or in the rectilinear selecting conductor of these storage elements, which involves a difference in structure between the control circuit relative to the selecting conductors of one of the series, and the control circuit relative to the selecting conductors of the other series.

In addition, in the case of storage matrices having a continuous superconductive film, it has been discovered that the action of the current flowing through the selecting conductors on the storage elements depends upon the configuration of these conductors. In particular, it has been found that the action of these currents is different along a rectilinear portion and in the neighbourhood of a bend of the conductor.

In a storage matrix having a continuous superconductive film, comprising rectilinear conductors and crenelated conductors, it is then necessary to provide special means in the control circuits to take account of the difference of configuration of these conductors.

One of the objects of the present invention is to avoid the aforesaid disadvantages in storage matrices under consideration.

Another object of the invention is to simplify the manufacture and the utilization of these storage matrices.

In accordance with the invention, a storage matrix of the type under consideration is characterised in that the useful portions of the selecting conductors are parallel to a common diagonal of the matrix.

The application of the invention to storage matrices formed of superimposed thin layers is particularly advantageous, because it is thereby possible to utilize for the row selection and for the column selection identical or quasi-identical circuits which are prepared by means of identical operations.

Figure 2:
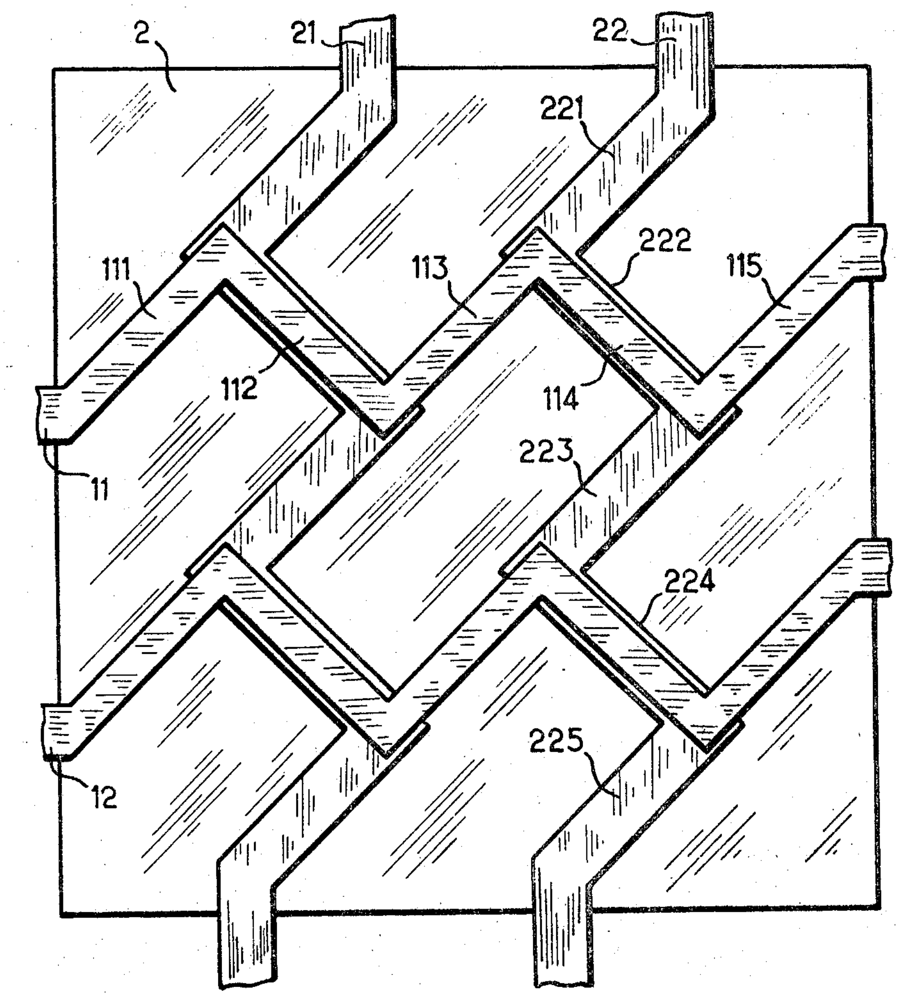

For a better understanding of the invention and to show how it may be carried into effect, the same will now be described, by way of example, with reference to the accompanying drawings, in which:

FIGURE 1 is a plan view of the recording medium and the selecting conductors of a storage matrix comprising superconductors according to the invention, and FIGURE 2 illustrates in the same way as FIGURE 1 the recording medium and the selecting conductors of another storage matrix according to the invention.

In FIGURE 1, there are shown a continuous sheet 2 of a superconductive substance and ribbon-form selecting conductors 11, 12, 13, 21, 22 and 23 deposited on the continuous sheet. These selecting conductors form two series I and II, i.e., the row conductors 11, 12, 13 and the column conductors 21, 22, 23, respectively. Each selecting conductor has the form of a broken line whose successive rectilinear segments are alternately parallel to two given directions, one of these two directions being parallel to one of the diagonals of the matrix. For example, it will be seen that the conductor 11 is formed of rectilinear segments 112, 113, . . . 117 and that the segments 112, 114 and 116 are parallel to the main diagonal of the matrix.

The configuration of the conductors and their relative arrangements are such that, at the crossing of two conductors of different series, for example 11 and 22, segments 114 and 222 of these conductors, which are parallel to the diagonal under consideration, are superimposed, and constitute the useful portions of these conductors.

FIGURE 2 illustrates by way of nonlimiting example another embodiment of the invention. In this figure, the elements corresponding to those of the previously described device are denoted by the same reference characters.

In the storage matrix illustrated in FIGURE 2, those portions of the selecting conductors which are not parallel to the main diagonal of the matrix are parallel to the other diagonal. This is the case, for example, with the portions 111, 113 and 115 of the row conductor 11, and with the portions 221, 223 and 225 of the column conductor 22.

I claim:

1. A data storage device having a plurality of storage elements arranged in a matrix configuration, and two sets of control conductors in the form of ribbon, respectively associated with the rows and the columns of the matrix and lying respectively in a first and a second plane parallel to the plane of the matrix, superposed portions of control conductors pertaining to different ones of said two sets being parallel to each other and to a given diagonal of the matrix, whereby the conductors of different sets may be given substantially identical configuration, which provides substantially identical control action of the conductors of different sets.

2. A superconductor memory matrix comprising:

a data storage medium in the form of a continuous sheet of superconducting material, and two sets of selection conductors in the form of ribbon-like strips of conductive material lying respectively in a first and in a second plane both parallel with the plane of said sheet and on the same side thereof, overlapping portions of two selection conductors pertaining to different ones of said two sets being parallel with each other and with a given diagonal of the matrix, whereby the conductors of different sets may be given substantially identical configuration, which provides substantially identical control action of such conductors upon the data storage medium.

References Cited

UNITED STATES PATENTS

| | | | |
|---|---|---|---|
| 3,172,086 | 3/1965 | Wendt | 340—173.1 |
| 3,238,512 | 3/1966 | Alphonse | 340—173.1 |

TERRELL W. FEARS, *Primary Examiner.*

JOSEPH F. BREIMAYER, *Assistant Examiner.*

U.S. Cl. X.R.

340—173, 174